United States Patent [19]

Golder

[11] Patent Number: 4,520,149

[45] Date of Patent: May 28, 1985

[54] ELASTOMER COMPOSITIONS

[75] Inventor: Michael D. Golder, Allendale, N.J.

[73] Assignee: GAF Corporation, Wayne, N.J.

[21] Appl. No.: 557,096

[22] Filed: Dec. 1, 1983

[51] Int. Cl.³ .............................................. C08L 67/02
[52] U.S. Cl. .................................... 524/100; 524/120; 524/195; 524/206; 524/209; 524/605
[58] Field of Search ............... 524/100, 120, 206, 605, 524/209, 195

[56] References Cited

U.S. PATENT DOCUMENTS

| | | | |
|---|---|---|---|
| 3,513,134 | 5/1970 | Filins | 524/206 |
| 3,524,832 | 8/1970 | Green | 524/206 |
| 3,640,929 | 2/1972 | Darling | 524/206 |
| 3,856,749 | 12/1974 | Hoeschele | 524/211 |
| 4,048,128 | 9/1977 | Eastman | 524/153 |
| 4,088,709 | 5/1978 | Seymour | 524/120 |
| 4,221,703 | 9/1980 | Hoeschele | 524/605 |
| 4,247,427 | 1/1981 | Edinger | 525/173 |
| 4,315,882 | 2/1982 | Hiratsuka | 524/505 |
| 4,355,155 | 10/1982 | Nelsen | 528/301 |
| 4,385,145 | 5/1983 | Hoin | 524/120 |
| 4,405,749 | 9/1983 | Nelsen | 524/100 |

*Primary Examiner*—John C. Bleutge
*Assistant Examiner*—Patricia Short
*Attorney, Agent, or Firm*—Joshua J. Ward

[57] ABSTRACT

Segmented thermoplastic copolyester elastomers containing recurring polymeric long chain ester units derived from phthalic acids and long chain glycols and short chain ester units derived from phthalic acids and 1,4-butanediol or 1,4-butenediol. The elastomers also contain small amounts of a quanidine stabilizer and small amounts of phosphorus stabilizer and diphenylamine.

13 Claims, No Drawings

ELASTOMER COMPOSITIONS

BACKGROUND OF THE INVENTION

Thermoplastic copolyester elastomers in which the polyester is modified with long rubbery segments have long been known in the art and are used in the preparation of molded and extruded articles. Such resins can be used alone or in conjunction with fillers or other resins to provide materials having a variety of properties. It is well known, however, that materials of this general type are subject to thermal degradation. U.S. Pat. Nos. 3,023,192, 3,651,014, 3,766,146, 3,784,520 and 3,763,109 are among prior patents describing elastomers of this type.

Unstabilized elastomers of the type described above exhibit poor processing behavior and unacceptable performance, especially at elevated temperatures. While a number of antioxidant stabilizers are available for use in polymers, many are unsuitable for use in copolyester elastomers of the type mentioned above because of the severe time-temperature conditions involved in the manufacture and/or use of such elastomers. When used in elastomers of this type, most available stabilizers either inhibit polymer formation or result in production of a non-white colored product. Additionally most available stabilizers do not provide adequate long term retention of desirable mechanical and thermal properties. U.S. Pat. Nos. 4,355,155 and 4,405,749 describe elastomer of the general type described above but which is modified to provide improved thermal stability together with a desirable white color.

SUMMARY OF THE INVENTION

It is an object of the present invention to provide thermoplastic copolyester elastomers of the general type described above, but with improved thermal stability, particularly at elevated use temperatures. In accordance with the invention, a thermoplastic elastomer composition is provided which consists essentially of:

(a) segmented thermoplastic copolyester elastomer consisting essentially of a multiplicity of recurring long chain ester units and short chain ester units joined head to tail through ester linkages, said long chain units being represented by the formula

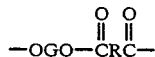

Formula I and said short chain units being represented by the formula

Formula II where G is a divalent radical remaining after the removal of the terminal hydroxyl groups from a difunctional polyether glycol having a number average molecular weight in the range from about 400 to about 6,000, R is a hydrocarbon radical remaining after removal of the carboxyl groups from terephthalic acid or isophthalic acid, and D is a divalent radical remaining after removal of hydroxyl groups from 1,4-butanediol or 1,4-butenediol; provided, said short chain units amount to between about 30% and about 85%, preferably between about 40 and about 65%, by weight of the copolyester;

(b) between about 0.05 and about 5% by weight of said copolyester of guanidine stabilizer of the formula

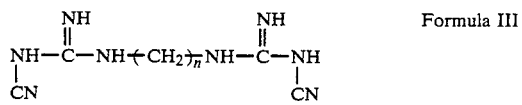

Formula III where n is an integer between 2 and about 20;

(c) between about 0.1 and about 5% by weight of said copolyester of diphenylamine derivative of the formula

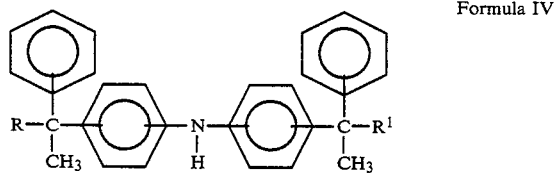

Formula IV where R and $R^1$ are methyl or phenyl; and (d) between about 0.05 and about 3% by weight of said copolyester of phosphorus compound of the formula

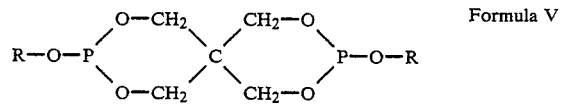

Formula V where R represents an alkyl radical having from 6 to about 22 carbon atoms or a hydrocarbon radical of the structure

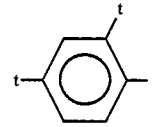

where t represents a tertiary butyl radical.

In preferred embodiments of the invention, at least about 80% of the R groups of formulas I and II are hydrocarbon radicals remaining after removal of carboxyl groups from terephthalic acid and between about 10 and about 40%, more usually between about 20 and about 30%, of the D groups of Formula II represent divalent radicals remaining after removal of hydroxyl groups from 1,4-butenediol.

DETAILED DESCRIPTION OF THE INVENTION

The long chain ester units of the product of the invention are the reaction product of a long chain glycol with terephthalic acid or isophthalic acid. The long chain glycols are poly(alkylene oxide) glycols having terminal (or as nearly terminal as possible) hydroxyl groups and hydroxyl numbers between about 18 and about 280 as determined in accordance with ASTM test method E-222. Corresponding number average molecular weights are between about 400 and about 6,000. Number average molecular weight for a particular glycol may be calculated by dividing the hydroxyl number into 112,200. Glycols used in the invention preferably have a number average molecular weight between about 400 and about 6,000 as carbon to oxygen ratio of between about 2.0 to 1 and about 4.3 to 1. Representative long chain glycols available for use in making product of the invention include poly(ethylene oxide) glycol, poly(1,2- and 1,3-propylene oxide) glycol, and poly(tetramethylene oxide) glycol. Poly(tetramethylene oxide) glycol is a particularly preferred glycol for long chain ester units of the invention.

Short chain units of product of the invention may be made by reacting 1,4-butanediol, 1,4-butenediol or a mixture thereof with terephthalic acid or isophthalic acid. In preferred embodiments 1,4-butenediol is used in amounts between about 10 and about 40%, more usually between about 20 and about 30%, based on the total of 1,4-butanediol and 1,4-butenediol. In making both the long chain and short chain units of product of the invention, the use or terephthalic acid is generally preferred with the use of between about 1 and about 20% isophthalic acid based on the total of terephthalic acid and isophthalic acid used being preferred when product of lower flexural modulus is desired.

The terms "terephthalic acid" and "isophthalic acid" as used herein are intended to include the condensation polymerization equivalent of such acids, i.e. their esters or ester-forming derivatives such as acid chlorides and anhydrides, or other derivatives which behave substantially like such acids in a polymerization reaction with a glycol. Dimethyl terephthalate and dimethyl isophthalate are for instance suitable starting materials for elastomers of the invention.

Copolyester elastomer for use in the invention can be made by conventional ester interchange reaction. A preferred procedure involves heating the dimethyl ester of terephthalic acid or of a mixture of terephthalic and isophthalic acids with a long chain glycol and a molar excess of a mixture of butanediol and butenediol in the presence of a catalyst at 150°–260° C. followed by distilling off of methanol formed by the interchange. Heating is continued until methanol evolution is complete. Depending upon temperature, catalyst and glycol excess, the polymerization is complete within a few minutes to a few hours. This procedure results in the preparation of a low molecular weight pre-polymer which can be carried to a desired high molecular weight copolyester by distillation of the excess of short chain diol in a conventional polycondensation reaction. Additional ester interchange occurs during this distillation to increase the molecular weight and to randomize the arrangement of the copolyester units. Best results are usually obtained if this final distillation or polycondensation is run at less than 1 mm pressure and 220°–255° C. for less than 2 hours in the presence of antioxidants. Most practical polymerization techniques rely upon ester interchange to complete the polymerization reaction. In order to avoid excessive hold time at high temperatures with possible irreversible thermal degradation, it is advantageous to employ a catalyst for ester interchange reactions. While a wide variety of catalysts can be used, organic titanates such as tetrabutyl titanate used alone or in combination with magnesium or calcium acetates are preferred. Complex titanates, such as derived from alkali or alkaline earth metal alkoxides and titanate esters are also very effective. Inorganic titanates, such as lanthanum titanate, calcium acetate/antimony trioxide mixtures and lithium and magnesium alkoxides are representative of other catalysts which can be used.

Prepolymers for product of the invention can also be prepared by a number of alternate esterification or ester interchange processes. For example, the long chain glycol can be reacted with a high or low molecular weight short chain ester homopolymer or copolymer in the presence of catalyst until randomization occurs. The short chain ester homopolymer or copolymer can be prepared by ester interchange from either the dimethyl esters and low molecular weight diols, as above, or from the free acids with the diol acetates. Alternatively, the short chain ester copolymer can be prepared by direct esterification from appropriate acids, anhydrides or acid chlorides, for example, with diols or by other processes such as reaction of the acids with cyclic ethers or carbonates. Obviously the prepolymer might also be prepared by running these processes in the presence of the long chain glycol.

Ester interchange polymerizations are generally run in the melt without added solvent, but inert solvents can be used to facilitate removal of volatile components from the mass at low temperatures. This technique is especially valuable during prepolymer preparation, for example, by direct esterification. However, certain low molecular weight diols, for example, butanediol in terphenyl, are conveniently removed during high polymerization by azeotropic distillation. Other special polymerization techniques, for example, interfacial polymerization of bisphenol with bisacylhalides and bisacylhalide capped linear diols, may prove useful for preparation of specific polymers. Both batch and continuous methods can be used for any stage of copolyester polymer preparation. Polycondensation of prepolymer can also be accomplished in the solid phase by heating finely divided solid prepolymer in a vacuum or in a stream of inert gas to remove liberated low molecular weight diol. This method has the advantage of reducing degradation because it must be used at temperatures below the softening point of the prepolymer. The major disadvantage is the long time required to reach a given degree of polymerization.

Molecular weight of elastomer used in product of the invention may vary widely depending upon end use requirements. For elastomer used in product of the invention melt flow rate (MFR) is usually used as an indication of molecular weight. The actual molecular weight of the elastomer is not usually determined. For typical uses of product of the invention such as extrusion or molding operations elastomer used frequently has an MFR between about 0.1 and about 50 grams/10 minutes (220° C., 2160 g) as determined in accordance with ASTM test method D-1238 although elastomer of greater MFR such as up to about 350 or more may be produced if desired.

Elastomer of the invention contains between about 0.05 and about 5 wt % based on polyester of guanidine stabilizer of the formula

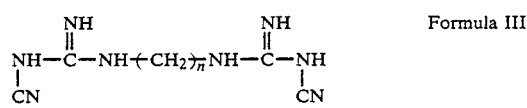

Formula III where n is an integer between 2 and about 20, preferably 5 or 6. Use of this type of stabilizer improves long term thermal stability of the elastomer. Stabilizer of Formula III in which n is 6, i.e. 1,6 Hexamethylene-bis-dicyandiamine (HMBD) is especially preferred.

Elastomer compositions of the invention also include between about 0.1 and about 5% by weight of said copolyester of diphenylamine derivative of the general formula

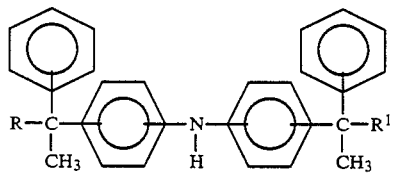

Formula IV where R and $R^1$ are methyl or phenyl and between about 0.05 and about 3% by weight of said copolyester of phosphorus compound of the formula

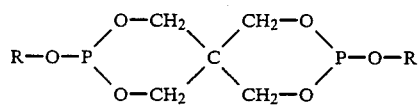

Formula V where R represents an alkyl radical having from 6 to about 22 carbon atoms or a hydrocarbon radical of the structure

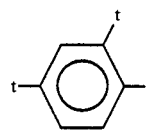

where t represents a tertiary butyl radical. Addition of these ingredients provides further unexpected improvement in thermal stability of elastomer of the invention.

Phosphorous compounds suitable for use in the invention include for instance
distearyl pentaerythritol diphosphite
dioctyl pentaerythritol diphosphite
diisodecyl pentaerythritol diphosphite
dimyristyl pentaerythritol diphosphite
bis(2,4 di-t-butyl phenyl) pentaerythritol diphosphite
Use of distearyl pentaerythritol diphosphite or bis(2,4 di-t-butyl phenyl) pentaerythritol diphosphite is preferred.

Small amounts of antioxidant stabilizer, such as between about 0.1 and about 5 wt % based on copolyester, are preferably included with the ingredients used in making copolyester for use in the invention. It is preferred that at least this small amount of antioxidant be present during polymerization of the copolyester in order to prevent excessive oxidation. Antioxidant consisting of 3,4-di-tert-butyl-4-hydroxyhydrocinnamic acid triester with 1,3,5-tris-(2-hydroxy ethyl-s-triazine-2,4,6-(1H, 3H, 5H) trione is preferred but other suitable stabilizers may be used.

Compositions of the invention may include additional conventional ingredients such as UV absorbers, e.g. benzophenones or benzotriazoles. The properties of these compositions can also be modified by incorporation of various conventional inorganic fillers such as carbon black, silica gel, alumina, clays and chopped fiberglass. In general, these additives have the effect of increasing the modulus of the material at various elongations. Compounds having a range of hardness values can be obtained by blending hard and soft copolyesters of the invention. The copolyesters can also be compounded with other resins such as polyvinyl chloride or polybutylene terephthalate. Suitable flame retardant additives may also be used.

As mentioned above, at least small amounts of antioxidant are preferably used during polymerization of copolyester of the invention. Other essential and optional ingredients of compositions of the invention are preferably added by blending with previously polymerized copolyester. All such ingredients or portions thereof may, however, be present during polymerization of the copolyester so long as the polymerization reaction is not interfered with. Blending with copolyester may be carried out in any suitable manner such as in conventional mixing equipment with extrusion compounding being preferred.

Elastomers of the invention exhibit superior retention of mechanical properties, especially tensile strength, and improved brittleness characteristics at elevated temperatures. Such elastomers are especially suited for use in molding various articles such as tires, hoses, drive belts, gears, etc. Such elastomers can be made in grades of low melt flow rate. This permits faster molding cycle times and allows the manufacture of blow molding grades of elastomers of the invention.

The following examples are intended to illustrate the invention without limiting the scope thereof.

In the examples presented herein, the following terms have the meanings given below.
DMT—dimethyl terephthalate
$B_1D$—1,4-butanediol
$B_2D$—1,4-butenediol
Poly(THF)—poly(tetramethylene oxide) glycol of number average molecular weight 1,000
TPT—tetra isopropyl titanate
Goodrite 3125—trade name for 3,5-di-tertbutyl-4-hydroxyhydrocinnamic acid triester with 1,3,5-tris-(2-hydroxyethyl)-s-triazine-2,4,6-(1H, 3H, 5H) trione
Naugard 445—trade name for γ,γ-dimethylbenzyl diphenyl amine (formula IV)
GT—weight percent of short chain ester units of formula II in elastomer of the invention
HMBD—1,6 Hexamethylene-bis-dicyandiamide Elastomer used in making the elastomer compositions referred to below is commercially available elastomer (GAF Gaflex 555) having a melt flow rate of about 12 grams per 10 minutes (220° C., 2160 g) and a GT of 62. 25% of the D groups of formula II are derived from 1,4-butenediol with the remaining 75% being derived from 1,4-butanediol. This elastomer is made from the following ingredients:

| Ingredient | Mols | Grams |
| --- | --- | --- |
| DMT | 6.13 | 1189 |
| $B_1D$ | 4.98 | 448 |
| $B_2D$ | 2.34 | 206 |
| Poly (THF) | 0.65 | 650 |
| Goodrite 3125 | | 35 |
| TPT | | 1.3 |

EXAMPLE 1

The elastomer described immediately above may be pelleted and tumble blended with various additional ingredients as indicated in Table I below to form elastomer compositions of the invention.

Such compositions may then be extruded or molded to form desired end products.

TABLE I

| Composition | Additional Ingredients | Amount (wt % based on resin) |
|---|---|---|
| A | 1,3 trimethylene-bis-dicyandiamide | 1 |
|   | Distearyl pentaerythritol diphosphite | 3 |
|   | Naugard 445 | 4 |
| B | 1,10 decylmethylene-bis-dicyandiamide | 2.5 |
|   | bis(2,4 di-t-butyl phenyl) pentaerythritol diphosphite | 2.0 |
|   | Naugard 445 | 0.5 |
| C | 1,16 hexadecylmethylene-bis-dicyandiamide | 4.5 |
|   | Dioctyl pentaerythritol diphosphite | 1.5 |
|   | methylphenyl benzyl diphenyl amine | 1.5 |
| D | 1,5 pentamethylene-bis-dicyandiamide | 0.5 |
|   | Naugard 445 | 1.5 |
|   | Diisodecyl pentaerythritol diphosphite | 0.5 |
| E | HMBD | 0.35 |
|   | Naugard 445 | 1.5 |
|   | Distearyl pentaerythritol diphosphite | 0.05 |

EXAMPLE 2

Elastomer compositions may also be formulated which are similar to those of Example 1 but which use elastomers in which R groups of Formulas I and II are hydrocarbon radicals remaining after removal of carboxyl groups from terephthalic acid, D groups of Formula II are divalent radicals remaining after removal of carboxyl groups from 1,4-butanediol and G of Formula I is a divalent radical remaining after removal of terminal hydroxyl groups from poly(tetramethylene oxide) glycol. Such elastomers are available for example from E. I. duPont de Nemours and Company in several GT grades under the tradename Hytrel.

While the invention has been described above with respect to preferred embodiments thereof, it will be understood by those skilled the art that various changes and modifications may be made without departing from the spirit or scope of the invention.

What is claimed is:

1. Thermoplastic elastomer composition consisting essentially of:
(a) segmented thermoplastic copolyester elastomer consisting essentially of a multiplicity of recurring long chain ester units and short chain ester units joined head to tail through ester linkages, said long chain units being represented by the formula

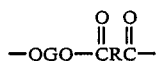   Formula I and said short chain units being represented by the formula

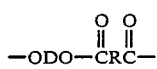   Formula II where G is a divalent radical remaining after the removal of the terminal hydroxyl groups from a difunctional polyether glycol having a number average molecular weight in the range from about 400 to about 6,000, R is a hydrocarbon radical remaining after removal of the carboxyl groups from terephthalic acid or isophthalic acid, and D is a divalent radical remaining after removal of hydroxyl groups from 1,4-butanediol or 1,4-butenediol; provided, said short chain units amount to between about 30% and about 85% by weight of the copolyester;
(b) between about 0.05 and about 5% by weight of said copolyester of guanidine stabilizer of the formula

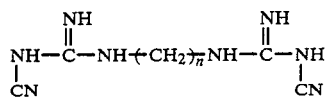   Formula III where n is an integer between 2 and about 20;
(c) between about 0.1 and about 5% by weight of said copolyester of diphenylamine derivative of the formula

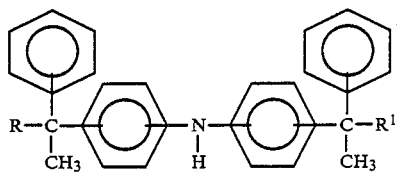   Formula IV where R and $R^1$ are methyl or phenyl; and
(d) between about 0.05 and about 3% by weight of said copolyester of phosphorus compound of the formula

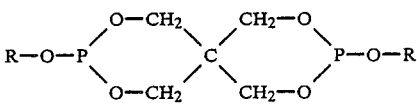   Formula V where R represents an alkyl radical having from 6 to about 22 carbon atoms or a hydrocarbon radical of the structure

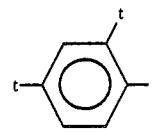

where t represents a tertiary butyl radical.

2. Elastomer composition according to claim 1 wherein the guanidine stabilizer is 1,6 hexamethylene-bis-dicyandiamide.

3. Elastomer according to claim 1 wherein between about 10% and about 40% of the D groups represent divalent radicals remaining after removal of hydroxyl groups from 1,4-butenediol.

4. Elastomer composition according to claim 1 wherein:
(a) G is a divalent radical remaining after removal of terminal hydroxy groups from a difunctional polyether glycol having a carbon to oxygen ratio between about 2.5 and about 4.3 to 1;
(b) the short chain units amount to between about 40 and about 65% by weight of the copolyester; and
(c) between about 20 and about 30% of the D groups represent divalent radicals remaining after removal of hydroxyl groups from 1,4-butenediol.

5. Elastomer composition according to claim 4 wherein G is a divalent radical remaining after removal of terminal hydroxy groups from poly(tetramethylene oxide) glycol.

6. Elastomer composition according to claim 1 which also includes between about 0.1% and about 5% by weight of said copolyester of 3,5-di-tert-butyl-4-hydroxyhydrocinnamic acid triester with 1,3,5-tris-(2-hydroxyethyl)-s-triazine-2,4,6-(1H, 3H, 5H) trione.

7. Elastomer according to claim 1 wherein the D groups represent divalent radicals remaining after removal of hydroxyl groups from 1,4-butanediol.

8. Elastomer composition according to claim 3 wherein the guanidine stabilizer is 1,6 hexamethylene-bis-dicyandiamide.

9. Elastomer composition according to claim 8 wherein:
(a) G is a divalent radical remaining after removal of terminal hydroxyl groups from poly(tetramethylene oxide) glycol;
(b) at least about 80% of the R groups of formulas I and II are hydrocarbon radicals remaining after removal of carboxyl groups from terephthalic acid;
(c) the short chain units amount to between about 40 and about 65% by weight of the copolyester;
(d) between about 20 and about 30% of the D groups represent divalent radicals remaining after removal of hydroxyl groups from 1,4-butenediol; and
(e) the elastomer composition also includes between about 0.1% and about 5% by weight of said copolyester of 3,5-di-tert-butyl-4-hydroxyhydrocinnamic acid triester with 1,3,5-tris-(2-hydroxyethyl)-s-triazine-2,4,6-(1H, 3H, 5H) trione.

10. Elastomer composition according to claim 3 wherein the phosphorous compound is distearyl pentaerythritol diphosphite.

11. Elastomer composition according to claim 3 wherein the phosphorous compound is bis(2,4 di-t-butyl phenyl) pentaerythritol diphosphite.

12. Elastomer according to claim 9 wherein the phosphorous compound is distearyl pentaerythritol diphosphite.

13. Elastomer according to claim 9 wherein the phosphorous compound is bis(2,4 di-t-butyl phenyl) pentaerythritol diphosphite.

* * * * *